(No Model.)
L. J. PHELPS.
BICYCLE.
No. 481,734. Patented Aug. 30, 1892.
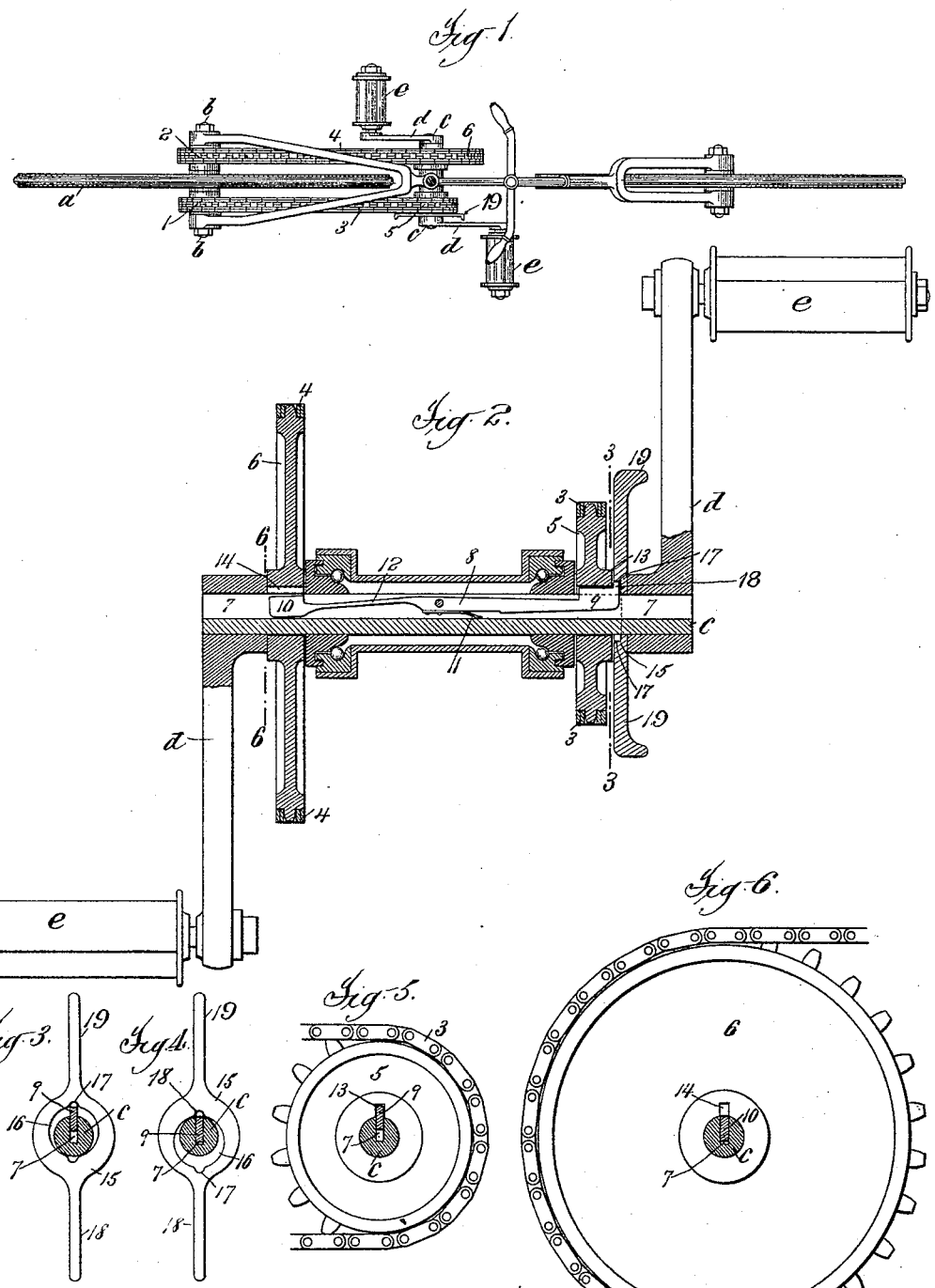

UNITED STATES PATENT OFFICE.

LUCIUS J. PHELPS, OF PASSAIC, NEW JERSEY.

BICYCLE.

SPECIFICATION forming part of Letters Patent No. 481,734, dated August 30, 1892.

Application filed October 3, 1891. Serial No. 407,645. (No model.)

*To all whom it may concern:*

Be it known that I, LUCIUS J. PHELPS, a citizen of the United States, residing at Passaic, county of Passaic, and State of New Jersey, have invented certain new and useful Improvements in Bicycles, fully described and represented in the following specification and the accompanying drawings, forming a part of the same.

The object of this invention is to provide a simple, cheap, and convenient changeable-speed gear for bicycles and tricycles which may be operated by the rider without dismounting from the machine; and I attain this object by the use of two sets of connections between the crank-shaft and driving-shaft, which are constructed to drive at different rates of speed, and either of which may be broken or closed to connect the crank-shaft and driving-shaft at the pleasure of the rider.

While my invention is of general application in bicycles employing connections between a crank-shaft and driving-shaft independently of the special form of such connections, the construction embodying the invention has been designed and is especially adapted for use in that class of machines in which the driving-shaft is actuated from the crank-shaft by sprocket-wheel and chain connections, as in the common types of tricycles and in Safety bicycles, and the invention will be illustrated and described as applied to such a bicycle.

In the accompanying drawings, forming a part of this specification, Figure 1 is a plan of a Safety bicycle embodying my invention, with the saddle and a part of the frame broken away to show the construction. Fig. 2 is an enlarged longitudinal section of the crank-shaft and devices for changing speed. Fig. 3 is a cross-section on the line 3, looking to the right. Fig. 4 is a similar section showing the parts in a different position. Fig. 5 is a section on the same line, looking to the left. Fig. 6 is a section on the line 6 of Fig. 2.

Referring to said drawings, $a$ is the driving-wheel, and $b$ the driving-shaft, of the bicycle, and $c$ the crank-shaft, which is actuated by the crank $d$ and pedal $e$, as usual. All these parts may be of any suitable construction, a common ball-bearing crank-shaft being shown.

Referring now to the parts embodying my invention, in place of the usual sprocket-wheel on each shaft and single chain I place upon the driving-shaft $b$ two sprocket-wheels 1 2, preferably on opposite sides of the wheel, as shown, and connect them by chains 3 4 to two sprocket-wheels 5 6, placed in corresponding positions on the crank-shaft $c$. The sprocket-wheels and chains on opposite sides of the wheel form two sets of connections between the crank-shaft $c$ and driving-shaft $b$, and are so constructed that either set of connections may be closed or thrown into operation or broken, so as to be thrown out of operation as desired, and in order that the driving-shaft $b$ may be driven at a higher or lower speed as one or the other set of connections are closed or thrown into operation the relative sizes of the sprocket-wheels on the crank-shaft and driving-shaft in the two sets of connections are varied.

It is evident that the breaking and closing of the two sets of connections may be attained by mounting the sprocket-wheels on either shaft, so as to be connected to and disconnected therefrom. In order to produce a construction in which the change may most conveniently be made by the rider, however, I prefer to break and close the connections at the crank-shaft, and I therefore mount the sprocket-wheels 1 2 rigidly on driving-shaft $b$ and the sprocket-wheels 5 6 loosely on the crank-shaft $c$, providing means by which the rider may readily connect one sprocket-wheel to the crank-shaft and disconnect the other without dismounting.

In the construction shown the change in speed is obtained by making the sprocket-wheel 6 larger than the sprocket-wheel 5, so that when the driving-shaft is operated through sprocket-wheel 6 the machine is driven at a higher speed, but requires a correspondingly greater expenditure of power than when operated from sprocket-wheel 5. The same result may evidently be attained, however, by making the sprocket-wheels 1 2 of different size and wheels 5 6 of the same size, or a greater variation with small sprocket-wheels may of course be obtained by varying the size of the sprocket-wheels on both shafts.

For the purpose of connecting and disconnecting the sprocket-wheels 5 6 to and from the crank-shaft c I prefer to use the following simple lever-key construction, which forms an important feature of my invention, although it will be understood that other devices may be use for this purpose in combination with other features of my invention, by which the changeable-speed mechanism is controlled by the foot of the rider.

The shaft c is provided on one side with a groove 7, extending longitudinally of the shaft, and in this groove is pivotally mounted a lever 8, which is provided at opposite ends with keys 9 10, adapted to lock to the shaft the sprocket-wheels 5 6, respectively, as the lever is rocked. A spring 11, carried by the lever 8 and pressing against the inner wall of the groove 7, tends to rock lever 8 so as to carry the key 9 into position to lock the sprocket-wheel 5 to the shaft. On the other side of its pivot the lever 8 is preferably formed into a spring-arm carrying the key 10, as shown at 12. The sprocket-wheels 5 6 are provided with grooves 13 14, adapted to receive the keys 9 10, respectively, so as to lock the sprocket-wheels to the shaft.

For the purpose of rocking the lever 8 against the tension of spring 11, so as to unlock the wheel 5 from and lock wheel 6 to the shaft and to release the lever, so as to allow the spring 11 to reverse this connection, I preferably use the following means: A sleeve 15 is mounted loosely upon the shaft c and is provided with a circular recess eccentric to the shaft c and into which the key 9 projects, the wall of the recess thus forming a cam-surface 16, by which the key is engaged and depressed when the sleeve is in a certain position relatively to the shaft, as shown in Fig. 4, so as to rock the lever 8 against the tension of spring 11 and carry the key 9 out of the groove 13 in sprocket-wheel 5, thus unlocking the latter from the shaft and at the same time raising the other arm of the lever to throw the key 10 into position to engage sprocket-wheel 6 in groove 14, thus locking the latter to the shaft. If the groove 14 be not opposite the key 10 when the latter is shifted to connect wheel 6, as just described, the spring-arm 11 will yield, allowing the lever to be rocked by the cam, and when the rotation of the wheel brings the groove opposite the key the latter will be thrown out to engage therewith by the spring-arm. When the position of the sleeve relatively to the shaft is changed so as to release the key, as shown in Fig. 3, the pressure of the spring 11 raises the key 9 and depresses key 10, so as to reverse the connection. If the groove 13 be not opposite the key 9 when this change is made, the spring will press the key on its release, so that it will be thrown out to engage the groove when it comes opposite the key. The sleeve 15 normally rotates with the shaft c, being frictionally held thereon. In order to insure its being thus carried, I may increase the friction by rounded notches 17 in the wall of the recess, which will be engaged by a projection 18 on the key 9, when the lever and sleeve are in position to lock either sprocket-wheel to the shaft, the sleeve thus being held in position with greater certainty, while readily disengaged from the shaft. It is evident that the lever 8 will be rocked to change the speed by the rotation of the shaft c inside the sleeve 15, so that it is necessary only to hold this sleeve stationary during a half-revolution of the shaft to disengage one sprocket-wheel and engage the other.

In order that the sleeve may readily be held stationary by the rider, I provide arms 19, projecting from the sleeve 15 on opposite sides and adapted to be engaged by the foot of the rider, so as to be held stationary during the movement of the shaft c. To change the speed, therefore, it is necessary for the rider only to change his foot from the pedal to that one of the arms 19 which is on the rear side and hold the arm and sleeve stationary during a half-revolution of the shaft. It is evident that one arm only may be used; but two are preferable, as one is always in convenient position for the foot.

The operation of the construction will readily be understood from the above description and only a brief further statement need be made. The larger sprocket-wheel 6 will normally be engaged with the crank-shaft c, so as to drive the machine at a high rate of speed, as machines of this class are now generally geared. The parts are then in the position shown in Fig. 4, with the key 9 depressed by the cam 16 and the key 10 in groove 14. When the sprocket-wheel 5 is to be used for lower speed and higher power, as in hill-climbing, the rider passes his toe from the pedal to the rear arm 18 of the sleeve 15 and holds it there until the shaft c has made a half-revolution, when the cam 16 will release the key 9 and allow the spring 11 to throw it into the groove 13 in sprocket-wheel 5, and the key 10 will be thereby thrown inward to unlock the sprocket-wheel 6, all the parts then being in the positions shown in Figs. 2, 3, 5, and 6. When the higher speed is desired, the same operation by the rider reverses the connections, returning the parts to their original positions.

What I claim is—

1. The combination, with the driving-shaft and crank-shaft of a cycle, of two sets of driving connections between the crank-shaft and driving-shaft constructed to drive at different speeds, a lever carried by one of the shafts and adapted to close either of the connections between the crank-shaft and driving-shaft according to its position, and a cam mounted on the shaft, and connections whereby said lever may be shifted by the foot of the rider, substantially as described.

2. The combination, with the driving-shaft and crank-shaft of a cycle, of two sets of driving connections between the crank-shaft and driving-shaft constructed to drive at different speeds, and a lever carried by one of the shafts and forming a key adapted to close either of the connections between the crank-shaft and driving-shaft and break the other according to its position, substantially as described.

3. The combination, with the driving-shaft and crank-shaft of a cycle, of two sets of driving connections between the crank-shaft and driving-shaft constructed to drive at different speeds, a lever carried by one of the shafts and forming a key adapted to close either of the connections according to its position, and a cam for rocking said lever to shift the connections, substantially as described.

4. The combination, with the driving-shaft and crank-shaft of a cycle, of two sets of driving connections between the crank-shaft and driving-shaft constructed to drive at different speeds, a lever carried by one of the shafts and adapted to close either of the connections according to its position, a spring pressing the lever in one direction to close one set of the connections, and a cam adapted to move the lever against the tension of the spring to close the other set of connections, substantially as described.

5. The combination, with the driving-shaft and crank-shaft of a cycle, of two sets of driving connections between the crank-shaft and driving-shaft constructed to drive at different speeds, a lever carried by one of the shafts and adapted to close either of the connections according to its position, and a sleeve loosely mounted on the shaft and normally carried thereby, said sleeve being provided with a cam-surface adapted to control the position of the lever to close either set of connections according to its position on the shaft, substantially as described.

6. The combination, with the driving-shaft and crank-shaft of a cycle, of two independent sets of driving connections between the crank-shaft and driving-shaft constructed to drive at different speeds, a lever carried by one of the shafts and adapted to close either of the connections according to its position, a sleeve loosely mounted on the shaft and normally carried thereby, said sleeve being provided with a cam-surface adapted to control the position of the lever to close either set of connections, and one or more arms on the sleeve whereby it may be held stationary to shift the connections, substantially as described.

7. The combination, with the crank-shaft and driving-shaft of a cycle, of two sprocket-wheels on each shaft, and chains connecting said wheels to form two sets of connections between the crank-shaft and driving-shaft, said connections being constructed to drive at different speeds, the sprocket-wheels on one of said shafts being mounted loosely, and a cam mounted on the shaft, and connections whereby said sprocket-wheels may be connected to and disconnected from the shaft by the foot of the rider, substantially as described.

8. The combination, with the crank-shaft and driving-shaft of a cycle, of two sprocket-wheels on each shaft and chains connecting said wheels to form two sets of connections between the crank-shaft and driving-shaft, said connections being constructed to drive at different speeds, the sprocket-wheels on one of said shafts being mounted loosely, and a lever carried by said shaft and forming a key connecting one or the other of the sprocket-wheels with the shaft according to its position, substantially as described.

9. The combination, with the crank-shaft and driving-shaft of a cycle, of two sprocket-wheels on each shaft and chains connecting said wheels to form two sets of connections between the crank-shaft and driving-shaft, said connections being constructed to drive at different speeds, the sprocket-wheels on one of said shafts being mounted loosely, a lever carried by said shaft and connecting one or the other of the sprocket-wheels with said shaft according to its position, and a cam controlling the position of said lever, substantially as described.

10. The combination, with the crank-shaft and driving-shaft of a cycle, of two sprocket-wheels on each shaft and chains connecting said wheels to form two sets of connections between the crank-shaft and driving-shaft, said connections being constructed to drive at different speeds, the sprocket-wheels on one of said shafts being mounted loosely, a lever carried by said shaft and carrying keys adapted to lock either sprocket-wheel to the shaft according to the position of the lever, said lever having a spring-arm by which one of the keys is carried, a spring pressing the lever into position to close connections by the other key and break connections by the key carried by the spring-arm, and a cam adapted to move the lever against the tension of the spring to reverse the connections, substantially as described.

11. The combination, with a crank-shaft and driving-shaft of a cycle, of two sprocket-wheels on each shaft and chains connecting said wheels to form two sets of connections between the crank-shaft and driving-shaft, said connections being constructed to drive at different speeds, the sprocket-wheels on one of said shafts being mounted loosely, a lever carried by said shaft and carrying keys adapted to lock either sprocket-wheel to the shaft according to the position of the lever, said lever having a spring-arm by which one of the keys is carried, a spring pressing the lever into position to close connections by the other key and break connections by the key carried by the spring-arm, and a sleeve loosely mounted on said shaft and normally carried thereby and provided with a cam-surface adapted to depress the lever against the spring-pressure or release the lever to shift the connections according to its position on the shaft, substantially as described.

12. The combination, with shaft $c$, having groove 7, of wheels 5 6, mounted loosely on said shaft and having grooves 13 14, and lever 8, pivoted in groove 7 and carrying keys 9 10, adapted to enter said grooves, substantially as described.

13. The combination, with shaft c, having groove 7, of wheels 5 6, mounted loosely on said shaft and having grooves 13 14, lever 8, pivoted in groove 7 and carrying keys 9 10, adapted to enter said grooves, and sleeve 15 on said shaft having a cam-surface controlling said lever, substantially as described.

14. The combination, with shaft c, having groove 7, of wheels 5 6, mounted loosely on said shaft and having grooves 13 14, lever 8, pivoted in groove 7 and carrying keys 9 10, adapted to enter said grooves, spring 11, pressing said lever into position to connect one of said wheels to the shaft, and sleeve 15 on said shaft having a cam-surface controlling said lever, substantially as described.

15. The combination, with shaft c, having groove 7, of wheels 5 6, mounted loosely on said shaft and having grooves 13 14, lever 8, pivoted in groove 7 and carrying keys 9 10, adapted to enter said grooves, one arm of said lever being a spring-arm, spring 11, pressing the other arm of said lever into position to lock the wheel on that side to the shaft, and a cam for moving the lever against the pressure of the spring, substantially as described.

In testimony whereof I have hereunto set my hand in the presence of two subscribing witnesses.

LUCIUS J. PHELPS.

Witnesses:
CHARLES RUST,
SAMUEL K. DINGLE.